April 11, 1950 M. H. WILBERT 2,503,981
AUTOMATIC HANDSAW SET
Filed Sept. 29, 1947 2 Sheets-Sheet 1

Inventor
Martin H. Wilbert

Inventor
Martin H. Wilbert.

Patented Apr. 11, 1950

2,503,981

UNITED STATES PATENT OFFICE 2,503,981

AUTOMATIC HANDSAW SET

Martin H. Wilbert, San Bruno, Calif.

Application September 29, 1947, Serial No. 776,643

7 Claims. (Cl. 76—66)

An object of my invention is to shape the teeth of a saw into the proper contour as well as give them the proper set and to assure that all teeth are set to the same degree. It is only by accomplishing these results that a perfectly sharp and smooth cutting saw will follow the operation of setting and sharpening.

The prime object of my invention is a machine that will set all the teeth of a saw in one pass of the saw thru the machine, thus making a quick and simple job of the operation of setting a saw.

Another object of my invention is to provide the utmost simplicity in adjustments of the machine so as to adapt it to the particular saw that will be operated upon. Since saws are made in different thicknesses and various numbers of teeth (to the inch of length) adjustments must be made as to width of gap, stroke of punch and forward feed of saw.

Other objects and advantages will appear in the following specifications and the novel features of the device will be more particularly pointed out in the appended claims.

My invention is illustrated in the accompanying drawings forming part of the application, in which.

Figure 1:
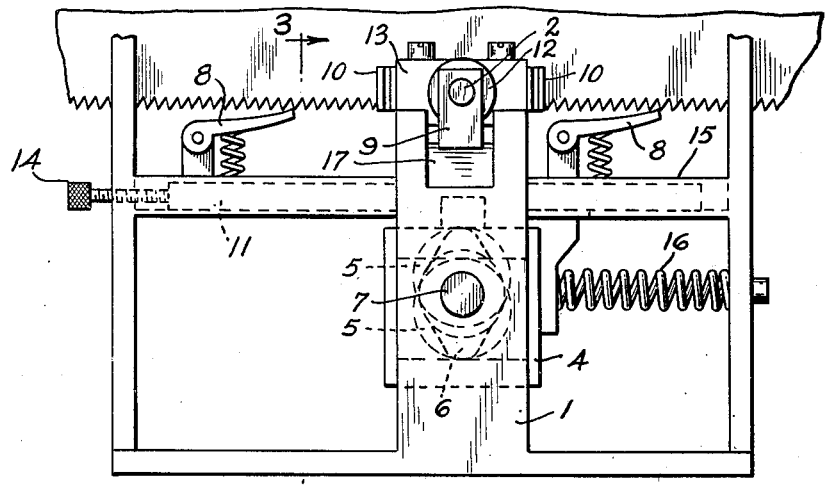
Figure 1 is a side elevation of the center section of device.

While I have shown only the preferred forms of my invention it should be understood that various changes or modifications may be made within the scope of the appended claims, without departing from the spirit and scope of the invention.

In carrying out my invention I provide a rather substantial box frame 1 which will have a shaft 7 central thru its sides. Upon this shaft 7 and inside the frame are mounted three cams, one of which is a double throw cam 6 and it is located at center of the frame and serves to drive a pawl bar 11 in the direction of saw travel thru the machine. The other cams 5 are set on the shaft 7 and up against the inside faces of the frame sides. These cams 5 drive sliding wedges up and down, along the sides of the frame 1 and the wedges 4 are directed in a straight path by edges which lap over the frame edges.

At the top center of the frame sides, apertures are cut so that a punch holder 9 may be inserted across the inside top of the box. This punch holder 9 has sturdy end blocks thru which the threaded ends of the punches 2 pass and adjusting nuts 12 allow for setting the punches in or out from the center. Attached to the bottom of punch holder 9 is a drive bar 17 which is engaged by the sliding wedges and driven back and forth across the frame as the wedges 4 alternately force and release it.

On top of the frame is located the setting head 13 which consists of two blocks which are bolted down to the frame 1. These blocks are set with a gap between them thru which a saw will pass and in order to take care of various thicknesses of saws, a provision is made for shifting one block by having the holddown bolts set in slots.

Figure 5:
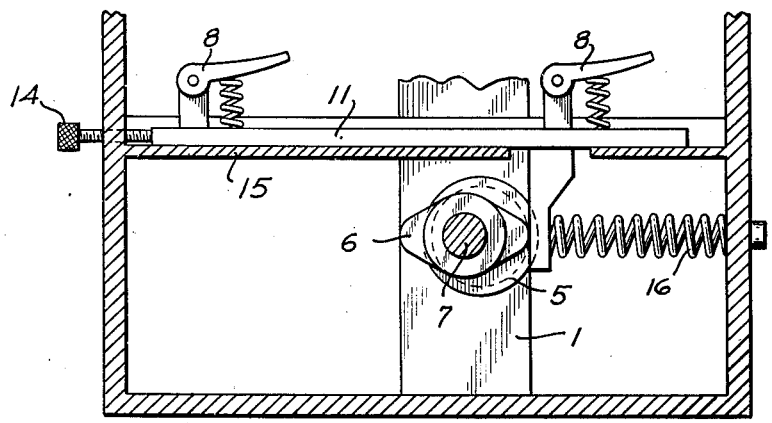
Figure 5 is a partial cross sectional view at 5, Fig. 2.
Figure 6:
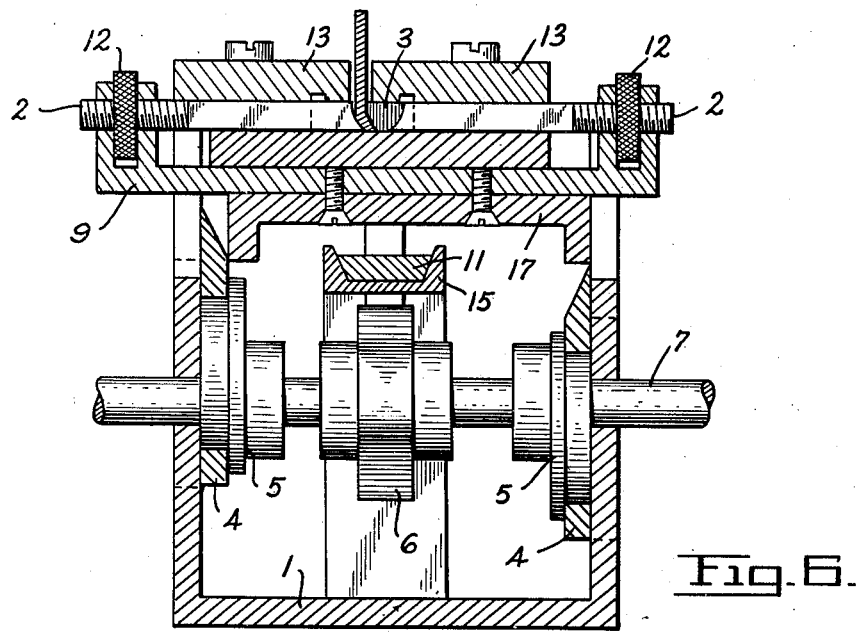
Figure 6 is an end view at 3 of Fig. 1 in partial cross section showing a punch in setting position on a saw tooth.

These head blocks 13 are milled out to fit the square bar punches 2 which slide in these ways. Crosswise to the punch ways are the anvil block ways which are milled to fit the cross-section of the anvil blocks 3 as shown in Fig. 5.

The punches 2 are tapered on the working end and the narrow, blunt ends of the punches are contoured so as to form a saw tooth when the punch forces it against the anvil blocks 3 which are also contoured on the side which contacts the saw tooth which is to be set.

Figure 2:
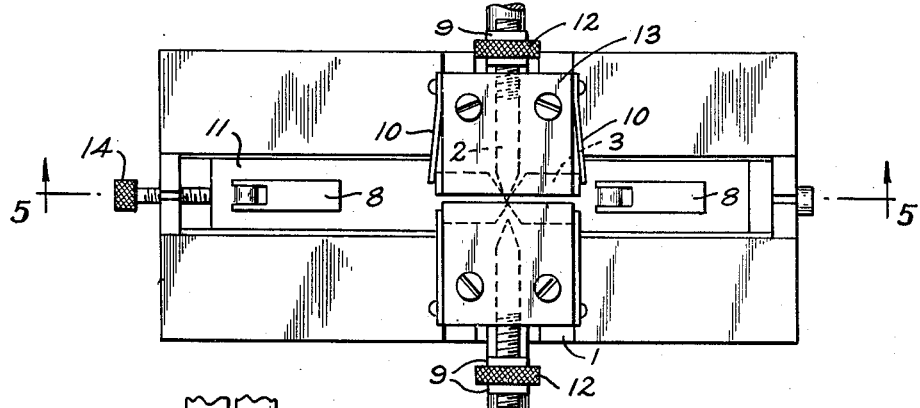
Figure 2 is a top plan of center section of device.
Figure 3:
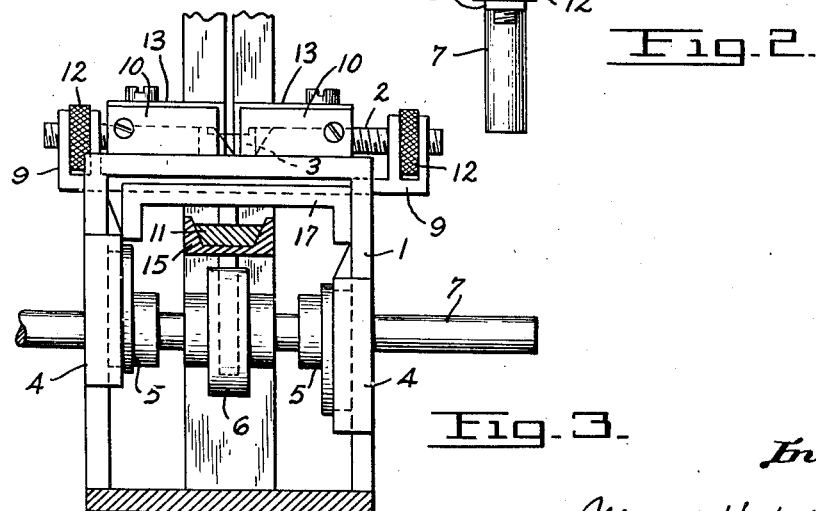
Figure 3 is an end view at 3 of Fig. 1.

The anvil blocks 3 are similar bars cut in the middle and beveled to fit the taper of the punches—see Fig. 2—and when the status of the punches is such that they are equidistant from the center of the head gap, then both anvils will be together at their middle points, while the punches rest in the tapered slots between the inside ends on the anvil blocks. The anvil blocks are retracted to this position and held together by springs 10 which bear against the outside extremities of the blocks.

When a punch 2 is forced in the direction of a saw tooth it forces its way thru a pair of anvil blocks 3 causing the blocks to spread apart against the springs 10 and after the punch has formed the tooth against the other pair of anvil blocks, the punch is withdrawn and the springs retract the anvil blocks so that the inside ends meet and again form a solid anvil surface.

The saw to be set travels thru the head gap transversely to the direction of motion of punches. It is propelled along this path by means of two pawls 8. The pawls 8 are mounted on a sliding pawl bar 11 which is driven by the double throw cam 6 and as this throw is constant the pawl bar will always advance the same distance at each stroke of the cam 6. An adjusting screw 14 controls the amount of back travel of the pawl bar 11 this back travel being ample so that pawl is dragged out of one tooth and falls freely into the succeeding tooth thus leaving the pawl set for the next forward stroke. A spring of sufficient strength 16 drives the pawl bar 11 back against the adjusting stop screw 14.

The two pawls are so located on the pawl bar 11 that their contact edges will be 2 inches before or behind the center line of the punches at the completion of forward stroke of cam 6. Since there are occasional saws which have fractional teeth or say 5½ teeth to the lineal inch, for 2 inches we would have a whole number of teeth, in this case 11 teeth—then 11 strokes of the pawl bar will bring a tooth into position for setting.

One pawl is required to feed a saw into the machine and the other pawl takes over and finishes the feeding of the saw thru and out of the machine. Also in case of slight variations in the size of the teeth the two pawls will average themselves so that a tooth halfway between them is always close to proper position for setting.

Figure 4:
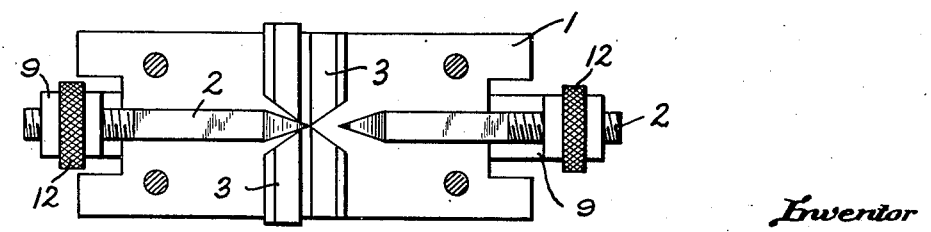
Figure 4 is a top view of head with blocks removed, so as to expose punches and anvils.

Due to the dual cam 6 drive of the pawl bar 11 the pawls 8 make two strokes for every revolution of the cams 5 which drive the sliding wedges 4. The resulting action is the setting of two saw teeth (consecutively) one to one side and the succeeding tooth to the other side. Looking at Fig. 4 the wedge 4 on the left hand side is at the top of its stroke and hence has just completed setting a saw tooth and as shaft 7 revolves this wedge will descend while the wedge on the right hand side will ascend. When this wedge is midway in its upper travel the other wedge is halfway down and at this point the center cam 6 drives the pawl bar 11 ahead and places the succeeding tooth in position to be set. This is accomplished when the right hand wedge reaches the top. It is plain that when the wedges are half way, the punch holder is central and hence the gap is clear for saw to slide along under power from the pawls.

The pawl bar 11 travels in a channel way 15 and this is slotted thru the bottom so that a drive lug projects thru and is contacted by the double cam 6 thus affording drive for pawls.

Summing up the action of the machine—the procedure to be followed is: check head gap for free sliding fit for saw that will be operated on; check travel of the punches and adjust so that tooth will be formed against anvil; check adjusting screw 14 so that it will allow sufficient back travel of the pawl bar so that pawl will drop into successive teeth in the saw; place saw in the head groove and rotate cam shaft.

The saw will now feed thru the machine and as soon as second pawl engages, will drive ahead completely thru and out of the head. The teeth will be set uniformly and job is ready for sharpening.

Without further elaboration, this disclosure will so fully reveal the gist of the improvements, that other can, by applying current knowledge, readily vary these improvements without omitting certain features, that from the standpoint of the prior art, fairly constitute essential characteristics of the generic and specific aspects of these improvements, and therefore such variations are intended to be comprehended within the meaning and range of equivalency of the following claims.

I claim:

1. In a saw setting machine, the combination of a box frame, a transverse shaft, a pair of opposing cams revolving with the shaft and abutting the inside faces of the frame where the shaft bearings are set and a double throw cam central to the pair of opposing cams and fixed to the shaft in such a manner that it drives when the other cams are in a neutral position, a pair of wedges driven by the opposing cams, a punch holder driven back and forth by the wedges, a pair of head blocks adjustably mounted on top of box frame, a pair of punches recessed into bottom of head blocks and traveling with punch holder along the center line of head blocks, two pairs of anvil blocks recessed and keyed into the bottom of adjacent faces of the head blocks and transversely to the center line of punches and spreading apart against retracting springs when acted upon by the punches and also a channel ways set lengthwise in the box frame and supporting a pawl bar which mounts a pair of pawls which engage the saw teeth and is driven forward by the central cam and is retracted against adjustable stop by a retracting spring.

2. The device set forth in claim 1, in which the slotted head comprises two blocks, horizontally disposed, end to end, on top of a box frame and so located that there is a gap between the contiguous ends, in which a saw may travel; one head being slidably mounted for adjusting width of gap, by means of slotted bolt holes; each block containing milled ways in the lower face one across the inside end in which the anvil blocks slide and the other, lengthwise thru the center and transversely to the anvil ways, which contains and directs the punches.

3. The device set forth in claim 1, in which the anvil blocks are in pairs—each pair consists of a right and left hand block and each having a beveled inside end—when together they touch along the face that is flush with the end of head block in the gap, and against which the saw is pressed, and they are beveled away from this line contact so as to form a wedge shaped space between them—normally, when together, each pair is flush with the outside faces of the head—when the blocks are forced they bear against flat springs and flex them outwardly and when free to return are brought back and held together at center by the springs—the contact face of the anvils is contoured to fit side profile of a properly formed saw tooth.

4. The device set forth in claim 1, in which two punches fashioned out of square bar steel, each having a threaded end for adjustment in and out and a wedge shaped end with a narrow blunt point—this blunt pointed end is formed into a contour, similar to the shaped face of the anvil; each punch slides in a transverse slot and the wedge shaped end drives into the wedge shaped space between the slidable anvil blocks thus gaining access to a saw tooth which it will set against the anvil on the other side of the saw tooth; each punch is adjustably mounted in a punch holder which is driven transverely to direction of saw travel, for setting the saw teeth.

5. The device set forth in claim 1, in which a rotatable shaft is mounted transversely thru the center of the frame sides and has three cams pinned in position upon it—the center cam is a double throw cam and functions to feed the saw twice for every revolution of the shaft—the other two cams are so disposed that each bears against the sides of the frame and drives a sliding wedge up and down; as each wedge has a rectangular window the width of the diameter of cam and edges which lap over the frame edges, it is directed along the sides of the frame and held up against the sides of frame by a flange on the cam; these wedges contact the ends of a drive bar which is fastened to the punch holder and thus functions to force the punches in and out for setting the saw teeth.

6. The device set forth in claim 1, in which a channel ways is mounted to the frame directly under the slot in the head and parallel to it and in the bottom of the ways there is a longitudinal slot—a pawl bar which slides freely in channel ways has a drive lug attached to it and this lug projects downward thru the slot so as to set ahead of and in line with the double throw cam —a stout coil spring engages this lug forwardly and presses back on the pawl bar at all times— an adjusting screw and stop, limits the back travel of the pawl bar—hinged to lugs which are mounted on pawl bar are two pawls which are pressed upwards by compression springs set directly beneath and pawls are spaced on the bar so that at the time the double cam is at its maximum stroke, the drive edge of the pawls will be about 2 inches before or behind the center line along the punches thus assuring the placing of a saw tooth directly opposite the punch even though the saw has a fractional number of teeth per lineal inch.

7. In a saw setting machine; a box frame mounting two head blocks, end to end, with an adjustable width of gap between them in which the toothed edge of a saw may travel; each head containing recesses in which anvil blocks and punches are slidably disposed, wedge shaped spaces between anvils allowing the wedge shaped punches to force their way between a pair of anvils and contact a saw tooth forcing it against the contoured and shaped faces of the anvil blocks on the other side of the saw tooth; the punches alternating in this action and the anvil blocks expanding against springs which retract and hold them together; a sturdy punch holder in which punches are adjustably mounted so that a nut will take the threaded end of the punch and set it in or out; a drive bar inside frame and fastened to punch holder in such a position that sliding wedges will pry the punch holder back and forth across the frame; a rotatable shaft centered in sides of frame and mounting three cams, a double throw cam in the center and which drives a pawl bar, two strokes for each turn of the shaft; ways to slidably contain a pawl bar and having a longitudinal slot so that a lug, integral with pawl bar, will project thru ways and be contacted by the double cam and at the forward end of ways a coil spring to act against cam and retract pawl bar against a stop screw in rear end of ways, which also serves as a means of adjusting the length of stroke of pawl bar and enables proper back stroke so that pawls will freely drop into successive teeth; setting of double cam in a position such that it will make full thrust on pawl bar at the point where the sliding wedges are midway in their vertical travel; the other cams on rotating shaft being pinned against the sides of frame and rotating in a rectangular window in the wedges causing them to ascend or descend, since wedges are guided by lips on their edges which lap over the edges of the frame sides, while flanges on the cams keep the wedges in contact with the inside face of frame.

MARTIN H. WILBERT.

REFERENCES CITED

The following references are of record in the file of this patent:

UNITED STATES PATENTS

| Number | Name | Date |
| --- | --- | --- |
| 187,940 | Turner | Feb. 27, 1877 |
| 363,854 | Schnoor | May 31, 1887 |
| 616,935 | Kent | Jan. 3, 1899 |
| 1,241,772 | Serfozo | Oct. 2, 1917 |
| 1,828,392 | Carpenter | Oct. 20, 1931 |
| 1,968,352 | Poeggel | July 31, 1934 |
| 2,109,161 | Biro | Feb. 22, 1938 |